3,530,143
MERCAPTOBENZOTHIAZOLE PROCESS WITH DIARYLAMINODITHIOPHOSPHORIC ACID CATALYST
Hanno Maria Merlin, Somerville, N.J., assignor to American Cyanamid Company, Stamford, Conn., a corporation of Maine
No Drawing Filed Oct. 10, 1967, Ser. No. 674,093
Int. Cl. C07d 91/48
U.S. Cl. 260—306                                 4 Claims

ABSTRACT OF THE DISCLOSURE

This invention relates to a novel process for making 2-mercaptobenzothiazole. More particularly, this invention relates to a novel catalytic process for making 2-mercaptobenzothiazole by the reaction of aniline, carbon disulfide and sulfur in the presence of an effective amount of a catalyst comprising a diarylaminodithiophosphoric acid.

---

This invention relates to a novel process for making 2-mercaptobenzothiazole. More particularly, this invention relates to a novel catalytic process for making 2-mercaptobenzothiazole by the reaction fo carbon disulfide, aniline and sulfur in the presence of an effective amount of a catalyst comprising a diarylaminodithiophosphoric acid, e.g., dianilinodithiophosphoric acid.

Among the large number of thiazole derivatives which are manufactured and used extensively as vulcanization accelerators for both natural and synthetic rubber, 2-mercaptothiazole is of prime importance. Methods of preparing 2-mercaptobenzothiazole have been the subject of extensive investigation for many years. The most commonly used synthesis is one based on the reaction of aniline, carbon disulfide, and sulfur. According to this method the reactants are charged to a suitable pressure vessel, for example, an autoclave, and heated at elevated temperatures for moderately long periods of time, i.e., up to about eight hours. As the reaction proceeds hydrogen sulfide, produced as a by-product of the reaction, accumulates and results in a pressure buildup in the autoclave.

Useful yields of 2-mercaptobenzothiazole are produced in this manner, i.e., greater than 80%, based on the aniline consumed. While this is a commercially useful process, there are distinct disadvantages inherent in it which result in high cost of manufacture. Thus, one of the major disadvantages of the conventional process is that extensive amounts of by-product tars are produced. This not only reduces the yield of 2-mercaptobenzothiazole, but it also necessitates a costly recovery step to bring the product to a desirable level of purity.

An additional disadvantage of conventional processes is the long reaction time required to obtain good yield of 2-mercaptobenzothiazole. Any method, therefore, which would reduce the reaction time required would obviously be economically advantageous, resulting in higher production capacity.

Benzothiazole is a by-product in the manufacture of 2-mercaptobenzothiazole. This by-product is used as an intermediate in the manufacture of other products, such as o-aminothiophenol by a caustic fusion process. The latter is also an important intermediate. Until the present time, benzothiazole has not been produced in good yields in conventional processes. It would thus be an added advantage if the manufacture of 2-mercaptobenzothiazole, by a reduction in tar formation, yielded more benzothiazole and less of the tarry by-products.

It is an object of this invention to provide a new method of producing 2-mercaptobenzothiazole whereby good yields of high-purity product are obtained. Other objects will become apparent from the following description of the invention.

It has now been discovered that if the reaction of aniline, carbon disulfide and sulfur is carried out in the presence of a diarylaminodithiophosphoric acid, e.g., dianilino dithiophosphoric acid, as described below, under the same conditions of reaction as used in the conventional process, the rate of reaction is materially increased and increased yields of 2-mercaptobenzothiazole are obtained in less time than is presently required.

An additional feature of the present invention is the discovery that when the reaction is catalyzed as described above, essentially no tars are produced and the yield of the by-product benzothiazole is increased by as much as 50% over the amount obtained by the conventional uncatalyzed reaction.

These results are surprising in that it was previously impossible to effectively catalyze the reaction. It is also surprising in view of the fact that certain compounds which might be expected to exhibit catalytic activity in this reaction are relatively ineffective, as for example, ammonium sulfide, triphenyl phosphine, diphenylamine, and an ethylene tetrasulfide polymer.

The process of this invention provides a means of producing 2-mercaptobenzothiazole wherein an essentially complete conversion of aniline to product is achieved in considerably less time, in higher yields and with better product purity and lower tar formation than heretofore possible.

According to the process of the present invention, aniline, carbon disulfide, and sulfur are charged to an autoclave along with the diarylaminodithiophosphoric acid catalyst. The reaction mixture is then heated under pressure at elevated temperature for a specified period of time, vented to remove excess carbon disulfide and/or hydrogen sulfide, and the product recovered by conventional means.

The range of concentration of reactants used in carrying out the reaction according to the present invention may vary widely. Although it is stoichiometrically possible, and indeed practical, to use equivalent amounts of aniline, carbon disulfide, and sulfur in conducting the reaction, it has been found to be particularly advantageous to utilize about 0.5 to 2.0 moles, or preferably about 0.8 to 1.4 moles, each, of carbon disulfide and sulfur, for each mole of aniline.

The temperature used in carrying out the reaction is not especially critical, but will generally be in the range of from 180° C. to about 300° C., or preferably from 220° C. to 250° C.

The pressure which is achieved in the autoclave is due mainly to the vapor pressure of carbon disulfide and by-product hydrogen sulfide at the temperature of reaction. It is permissible, but not necessary, to additionally pressurize the autoclave with an inert gas, such as nitrogen, carbon dioxide, etc. The reaction pressure is not especially critical but will usually be in the range of from about 300 lbs./in.$^2$, preferably 800 to 1500 lbs./in.$^2$.

The diarylaminodithiophosphoric acids are known compounds and can be obtained by known methods. Among the compounds useful as catalysts in this invention are those derived from monocyclic and bicyclic aromatic monoamines such as aniline, toluidines, xylidines and naphthylamines.

The diarylaminodithiophosphoric acids may be added in pure form to the reaction mixture containing aniline, sulfur and carbon disulfide. It is soluble in aniline and slightly soluble in carbon disulfide; hence, if desired, the catalyst may be added to the reaction mixture as a solution in aniline or carbon disulfide. The catalyst is preferably added to the reaction mixture in pure form or as a solution in aniline. The concentration of the arylaminodithiophosphoric acid used to catalyze the reaction should be carefully controlled for best results. Based on the amount of aniline charged to the reaction mixture, desirable results of the present invention are achieved when the catalyst is used in a concentration of from 0.01 to about 5.0 mole percent, based on the amount of aniline used. However, preferably from 0.5 to 1.5 mole percent of catalyst are used.

2-mercaptobenzothiazole is a well-known accelerator of vulcanization for both natural and synthetic rubber and as such is a very important commercial material. It has also found use in fungicidal and bacteriocidal applications.

The invention is illustrated in the examples which follow.

EXAMPLE 1

A mixture of 4.65 parts of aniline (0.05 mole), 4.56 parts of carbon disulfide (0.06 mole), and 1.73 parts of sulfur (0.054 mole) was added to a mini-clave. Decantless, dianilino dithiophosphoric acid (0.105 part) was added and the reaction mixture heated to 240° C. After 1.5 hours at 240° C., 65.87% of the aniline was converted to 2-mercaptobenzothiazole. The product was found to contain 3.88% of benzothiazole and was relatively free of tarry impurities.

When the foregoing reaction was carried out in substantially the same manner except for the omission of the dianilino dithiophosphoric acid catalyst, the product was found to contain only 20% mercaptobenzothiazole after 1 hour and only 53% mercaptobenzothiazole after 2 hours. After 6 hours of reaction the uncatalyzed reaction mixture contained only 3.6% benzothiazole.

EXAMPLE 2

The procedure of Example 1 was repeated except for the addition of 0.07 gram of mercaptobenzothiazolyl disulfide (0.07 part). The reaction product was analyzed after 1.5 hours and found to contain 68.27% of the product mercaptobenzothiazole and 4.14% of benzothiazole.

From the foregoing examples, it can be seen that the compound dianilinodithiophosphoric acid, is a catalyst for the reaction of aniline, carbon disulfide, and sulfur to produce mercaptobenzothiazole. The catalyst of this invention is able to provide higher yields of product in shorter reaction times while at the same time enhancing the yield of the byproduct benzothiazole. It can also be seen from the foregoing examples that the catalytic activity of arylaminodithiophosphoric acids is increased by the presence of mercaptobenzothiazolyl disulfide. The latter compound can be used in amounts of 0.5 to 10.0 moles per mole of the diarylaminodithiophosphoric acid to provide similar enhancement of reaction rates and product yields.

Similar results are obtained substituting di(p-toluidino)-dithiophosphoric acid, di - (2,4-xylidino)dithiophosphoric acid or di-(2-naphthylamino)dithiophosphoric acid as the catalyst in the procedures of Examples 1 and 2.

What is claimed is:

1. In a process for the manufacture of 2-mercaptobenzothiazole wherein aniline, carbon disulfide and sulfur are heated at an effective temperature under pressure in an autoclave, and wherein the mole ratio of carbon disulfide and sulfur to aniline is about 0.5 to 2.0 moles of each per mole of aniline, the improvement which comprises carrying out the reaction in the presence of from 0.01 to about 5.0 mole percent based on aniline, of a catalyst comprising a diarylaminodithiophosphoric acid derived from an unsubstituted monocyclic or bicyclic aromatic monoamine or a lower-alkyl substituted monocyclic or bicyclic aromatic monoamine.

2. The process according to claim 1 wherein the reaction is conducted at a temperature of from 180° to 300° C.

3. The process of claim 1 wherein the catalyst is selected from dianilinodithiophosphoric acid, di(p-toluidino) dithiophosphoric acid, di - (2,4 - xylidino)dithiophosphoric acid, and di(2-naphthylamino)dithiophosphoric acid.

4. The process of claim 1 wherein the catalyst is dianilinodithiophosphoric acid.

References Cited

UNITED STATES PATENTS

| 1,631,871 | 6/1927 | Kelly | 260—306 |
| 2,631,153 | 3/1953 | Paul et al. | 260—306 |

ALEX MAZEL, Primary Examiner

R. J. GALLAGHER, Assistant Examiner